3,196,020
METHOD FOR PREPARING PROTOPECTIN COMPOSITIONS FOR BAKED GOODS
Lincoln T. Work, 15 N. Crescent, Maplewood, N.J.
No Drawing. Filed Apr. 3, 1962, Ser. No. 184,651
9 Claims. (Cl. 99—100)

This application is a continuation-in-part of my application Serial Number 55,135, filed September 12, 1960, and now abandoned.

This invention relates to protopectin compositions and to their utilization in the preparation of food products particularly cereals, breads and baked foods in general.

Protopectin, derived from the fibrous and pulpy parts of fruit, is a combination of pectin and hemi-cellulose. It has no food value and, normally, is not a component of processed food products. It absorbs water freely, on the order of 18 to 20 times its own volume, and this is a useful dietary property. By the inclusion of a small proportion of protopectin in the diet it is possible for a person to eat a modest meal, feel well satiated from the swelling of the protopectin in the stomach, and yet have a low caloric intake, not only through the lack of caloric food value in the protopectin, but more so through the lesser intake of other foods following the absorption and swelling of the protopectin in the stomach. The protopectin possesses further value in that it hydrolyzes to yield pectin, which exerts a purifying influence, and hemicellulose which is particularly desirable in normalizing the intestinal function.

Citrus fruits are the major source of commercial protopectin. Protopectin from the citrus peel or hull contains oil, color, and flavor which makes it difficult to purify to a bland, white powder. It is produced as a low density flocculant powder. Protopectin from the veins and from the coverings of the individual juice sacs is more easily converted to a bland powder. The physical structure of the protopectin depends on the part of the fruit from which it is extracted. The protopectin which is derived from the juice sacs will appear under the microscope as a flat particle with veins in it, whereas the protopectin from the hull of the fruit has the appearance of tiny sponges. The inner fibrous parts of the fruit also yield a protopectin closely similar to that obtained from the juice sacs. Chemically and nutritionally the various forms of protopectin, known in the trade as "citrus flour," appear to have practically the same characteristics.

Finely pulverized, protopectin resembles flour, but cannot normally be used to replace flour because it absorbs water too rapidly. For example, in the preparation of baked goods the absorption of water by protopectin derived from the hull type of protopectin is so rapid that the dough will turn into a hard rubbery consistency which precludes the manufacture of a finished product. As a component of a dry mixture the protopectin will remain stable, but immediately upon contact with water the mix containing it absorbs a great deal of water. The protopectin absorbs the water, and, quite soon, what should be a pliable, wet dough becomes a heavy cementitious mass; or else the dough absorbs water too fast, swells to its maximum immediately and thus becomes useless. Using the fibrous types of protopectin, the mix remains soft with the large amounts of additional water required and with a resultant soggy product.

A method is known for the treatment of dry powdered pectin with an edible oil or fat, or fatty acid, for use in bakery products. The dry powdered pectin for use in this process is a solid, dense material. According to this process the pectin is coated with a liquid oil or fat, or with a semi-solid or solid fat while in a melted (liquid) condition. The method is described particularly with respect to the dense powdered pectin product which is commonly prepared from aqueous solutions, for example, by spray drying, or by precipitation with alcohol or a salt, and drying the precipitate. If the treated pectin is not in a sufficiently finely divided form for use in bakery products, the pectin is then ground in suspension in a liquid oil or fat to a sufficiently fine state of subdivision. In the alternative, the pectin may be admixed with a melted solid fat while in the liquid condition and the product cooled and solidified, whereupon the pectin is held in a solidified matrix of the fat; the solidified product is then sufficiently hard and brittle to permit grinding to facilitate its mixture in the dough batches for baking purposes.

When the above described method for treating dense powdered pectin is applied to protopectin, which acts like a sponge and soaks up the oil or melted fat up to many times its own weight, the amount of fat absorbed by the protopectin is so large that the protopectin so treated cannot be used satisfactorily in bakery products, and especially for bread. If enough fat is used to coat all the protopectin particles, the dough will not rise properly. As is well known in the baking industry, the effect of the fat is to weaken the gluten strands which produce the gas-retaining films. Moreover, an excess of fat will remain in the bread and this defeats the purpose of the use of protopectin for avoiding too much fat in the diet. If one uses less than enough fat to coat all the particles, the uncoated particles will absorb water, and the loaf will be soggy due to an excess of water. For obtaining a dietetic bread for laxative purposes which is consumed in the usual amount of three to five slices a day, it is necessary to incorporate an amount of protopectin equal to 15% to 25% of the weight of the flour in the loaf. The teachings of the prior art process which was developed for the denser pectin material cannot be used to produce a commercially acceptable baked product containing as much as 15% to 25%, based on flour, of the porous protopectin material. A method had to be devised to control the penetration of the fat into the highly absorbent protopectin particles in order that the total permissible amount of fat which could be used in the bread would coat all the particles of the protopectin and thus prevent the absorption of excessive amounts of water.

The applicant has discovered that commercial grades of protopectin, and especially the finely divided, highly water absorbent protopectin derived from citrus fruits, can be adequately treated so as to put it in a form which will give it adequate holding time against absorption of water in the mixing and kneading operations preliminary to baking, by treating it with a polyphase system comprising a suspension of a solid particle in a fluid medium. It is not necessary that this solid particle by a hydrophobic material such as fat, oil or fatty acid, as is taught in the prior art process; it is only necessary that the coating particle be solid at the time of application so as to bridge the pores in the protopectin particle. The particle size of the solid in the polyphase system is related to the size of the open pores in the protopectin material to be treated, which in turn is related to the part of the fruit from which the protopectin is derived. For best results the treatment of the different physical forms of protopectin must necessarily vary. Certain of the modifications of the applicant's invention described in the examples are more successfully applied to one type of protopectin than to another as is described in more detail below.

The applicant's invention in its broader aspects contemplates the treatment of protopectin with a polyphase system comprising a suspension of solid particles in a fluid medium, whereby the fluid medium is blotted into the protopectin, leaving the solid particles to be rubbed out or coalesced on the outer surface of the protopectin particles to form a coating which delays the action of water in the swelling of the protopectin and makes it possible to work with the protopectin in water-wet mixtures. Thus the solid particle coats the protopectin without appreciable penetration. The coating is edible and dissipates under heat and steaming during the cooking process, under which conditions the protopectin does not swell prohibitively.

In one embodiment of my invention the protopectin is treated with a hydrophilic colloidal material such as starch, albumen or gelatin. These materials are not water resistant in themselves, but render the protopectin less absorbent than it normally is, when applied as a coating so as to close the openings and seal the particles.

For the fibrous protopectin from citrus fruit juice sacs, the preferred method is to treat the protopectin with a colloidal aqueous suspension of starch. Using starch, the starch is first boiled with water to break the cells. The paste is cooled and added to the protopectin with thorough mixing and rubbing to coat the surfaces of the protopectin particles. The water blots in and the colloidal starch is filtered out on the surface and in the pores. The coated protopectin is basically dry but has a surface which is slightly jelly-like when wet, but dries to form an impermeable film. The starch helps by shrinking and perhaps pulling the fibrous particles into a denser mass, so as to close the openings and seal the particles in order that the internal fibrous structure will not be receptive to water during the mixing period of the protopectin in use. A superficial surface drying i.e. at approxmately 212° F. may be desirable. To give a case hardening to the protopectin particle-starch surface, the preferred drying temperature is about 300° F., which temperature is sufficient to drive off the water, yet insufficient to scorch the product. This treatment alone so reduces water permeability that protopectin flour treated in this way can be used successfully in bread formulas containing up to 15% protopectin based on flour using normal water additions of 60–75 cc. per 100 grams of flour. The resultant baked bread will have a moisture content which is consistently in the range of 36 to 39% moisture content, whereas bread baked with untreated protopectin is soggy and will have a moisture content well above 40%. This soggy bread will take several days to dry out to a useful moisture content, during which time it becomes deformed in shrinking.

The amount of the starch required is small. For example, using a 2% boiled starch paste at about 25%–50% by weight of the protopectin, the starch addition is only about 0.5%–1.0% by weight of the dry powder. Gelatin, albumen and other colloidal substances may be used in much the same way as starch. The amount of the colloidal substance in the dry form which is applied is about 0.25% to 2% of the protopectin to be treated, and preferably about 0.5%.

The starch treatment alone is adequate for the preparation of soda biscuits where the mixture need not be allowed to stand for an appreciable time before baking. The starch treatment is usually necessary, at least as a pre-coating treatment, for the new types of fibrous protopectin from the juice sacs of citrus fruits. As previously discussed this type of protopectin has a different physical structure from the old types of spongy protopectin from the hulls of the fruit.

A second modification of the applicant's invention is to use a polyphase system comprising a solid fat dispersed in a liquid carrier such as water or oil. The terms "fat" and "oil" as used in this specification refer to the glyceride esters of fatty acids. A "solid fat" is one which is in the solid state at room temperature, as contrasted with an "oil" which is in the liquid state at room temperature. Since the end product sought is to be edible, the components of the coating material should be edible and acceptable in accordance with Food & Drug Administration standards.

A particularly useful two-phase system for treating protopectin is an aqueous emulsion of a mono- or diglyceride which is solid at ambient temperature. If this emulsion is rubbed off on the protopectin surface, the water will be absorbed to only a small extent on the protopectin and the emulsion solid becomes the coating material. In order to obtain a continuous film of the solid fat, it is preferable to warm while drying, thus melting the fat while drying the water away from the protopectin particle. Mechanical or jet mill action also helps in the spreading of the coating to a film. An aqueous emulsion thus offers a means for spreading the coating without noticeable penetration of the surface, because the droplets of the media will not blot up during the processing; only the thin layers will do so, thus permitting the entire surface to be covered before the blotting medium is entirely removed. Commercial grades of mono- and diglycerides having melting points of about 125° to 140° F., and having a water content up to 67%, are suitable for coating protopectin. Examples of polyphase systems include oil-solid fat compositions dispersed in water.

The liquid carrier of the solid fat may also be an oil. As a general rule a solid fat having a melting point at least 50° F. higher than the oil in which it is to be dispersed is preferred. This condition is best satisfied by a hard beef fat or a hydrogenated vegetable oil having a melting point above 100° F., in combination with vegetable oils, such as corn oil, rapeseed oil, peanut oil, olive oil, sunflower seed oil, sesame oil and the like.

The proportion of hard fat in the oil will vary with the particular type of ingredients used and with their workability in applying the coatings. A combination of 30% solid fat dispersed in 70% liquid fat or edible oil has been found to be a useful ratio. Other proportions of dispersed and fluid phases may be employed.

When the solid fat dispersion is applied to the protopectin surface, the fluid medium is blotted into the protopectin, leaving the solid particles to coalesce on the outer surface of the protopectin particles to form the coating. Thus the solid fat coats the protopectin without appreciable penetration. Microscopic studies of the treated protopectin particles reveal that the structure is characterized by a superficial outer layer of hard fat under which is a slight layer of protopectin penetrated by the liquid carrier, while the rest of the protopectin particle, that is the central core, remains untouched. The solid fat dispersion type of coating is usually preferred for the spongy hull type of protopectin.

Other compositions of a nature similar to these described above may be employed which will present a liquid phase to the citrus flour surfaces such that a portion of the fluid will blot into porous areas and leave a surface coating which seals these areas against further penetration by water during the critical processing periods.

The total amount of the solid fat-oil composition used for treating will range from about 3% to about 8% of the weight of the protopectin, depending on its previous porosity and its mesh (60 to 200 mesh are commonly the limits of coarseness). Certain of the above described modifications of the applicant's invention are more successfully applied to one type of protopectin than to another. The nature of the treatment is also somewhat related to the degree of fineness in which the protopectin is obtainable. Citrus fruit hulls have generally been the major source of all protopectin, but more recently in the commercial juicing plants protopectin compositions have been salvaged in large quantities from the juice sac of the orange. Fundamentally this is protopectin of the same cellulosic composition as that obtained from the hulls but it has a different fibrous structure.

Protopectin originating from the hulls of the citrus fruit is of a spongy texture and directly amenable to treatment with the hard fat-oil dispersion or the aqueous glyceride emulsions to provide a superficial coating. This coating impedes initial absorption of water by the protopectin and permits substitution of 15-25% based on the flour in the formula by protopectin, and subsequent preparation of dietary baked products using conventional baking techniques.

Protopectin from the interior of the citrus fruit, especially from the juice sacs, is of a platey-fibrous structure or a loose open network not amenable to direct hard fat-oil or shortening treatments without the use of very excessive amounts, which would defeat the purpose of using protopectin in the formula. In using this form of protopectin, a light coating of a colloidal aqueous material is preferred. This blots out the colloidal material without introducing excessive moisture and leaves the colloid as a coating. This may be dried to produce a "case hardened" effect; i.e., the extra drying of the surface creates an impermeable shell around the protopectin particles. Microscopic examination shows little change in physical appearance with a hard fat-oil treatment. However, when the material is agglomerated and even case hardened with starch, albumen, or gelatin, it changes and appears as opaque dense particles in agglomerates. The case hardening thus apparently provides a dry surface layer, which effect is rather completely confined to the surface, thereby causing it to form a relatively impervious shell.

A finish coating of a hydrophobic nature may be desirable and, in some cases, necessary for water resistance. When a finish coating is also used the coating material in total amount will not exceed 10% by weight of the protopectin material. Specific practice in a given baking situation will determine whether protopectin which is precoated with starch, albumen or gelatin should receive the finish coating with a solid fat-oil composition. In general, it is possible to use the case hardened protopectin to a limited extent in baked goods formulations, such as cookies, muffins and light products. For bread use and general effectiveness, the case hardened product is preferably given a polishing treatment with the solid fat-oil mixture, or with the glyceride emulsion.

From the above discussion it is evident that a treatment is described which is adapted to take care of the variations in the water absorption properties of the various types of protopectins which are commercially available. The invention, accordingly, is embodied in a protopectin in finely divided form suitable for adaptation to a variety of formulas for processed foods or baked goods wherein the protopectin carries a surface coating, the individual particles being only superficially penetrated, yet leaving an impermeable coating so that water is prevented from access to the inner absorptive part of each particle. As previously discussed, the requirements for such a protective covering to render protopectin essentially impermeable to water during the mixing and rising periods differ somewhat for the hull type and the fibrous pulps. However, each type can be adequately coated by combinations of the steps, or all of the steps employed in this invention. The test resides in evaluating the water requirements of the particular mix to keep them normal and not excessive. The full technique is applicable to all forms of protopectin while being necessary for certain of the fibrous types of citrus flour.

The most important application of the treated protopectin is for baking a dietetic bread which is used for intestinal regulation purposes. For bread which is consumed in the usual amount of 3 to 5 slices per day it is necessary to incorporate an amount of protopectin equal to 15% to 25% based on the weight of the flour in the loaf.

There are critical limitations in (1) the amount of protopectin necessary for physiological effectiveness, (2) maximum amount of fat permissible, and (3) maximum amount of water which will give a commercially acceptable product. These amounts are interrelated. In earlier efforts at including protopectin in baked goods, attempts to use large amounts of shortening were inadequate. Speeding the mixing, rising, and forming time has not made possible an acceptable technique for using untreated protopectin as a citrus flour in baked goods. The mix either becomes hard and cementitious with normal water addition, or it is maintained soft with large amounts of additional water with a resultant soggy product. For example, when untreated protopectin was used, the bread had a moisture content of 41% to 44%; it was soggy and took several days to dry out to a level of usefulness, whereas when juice sac protopectin was used which had been treated with the combination starch and hard fat-oil treatment, the bread consistently had a moisture content of 36% to 39% which compares with 38% which is normal.

It is important that the water content of the baked goods be controlled not only during baking, but also after the product is baked and placed in the hands of the consumer. A protopectin which has been treated to give only a thin surface film by the applicant's process, and without penetration, will not only take up a controlled amount of water during the baking, but also will hold the water after baking.

The coating on the protopectin, which serves to prevent water absorption during the mixing, standing, and forming stages, is essentially dissipated in the baking process, since there is moisture, heat, and diffusion. At that time, the basically efficacious form of the protopectin is restored in the finished goods. Thus, the water absorptive properties of the protopectin are retained in the baked loaf. It is observed that the degree of dryness or staleness of the product is considerably less than that of similar products prepared under the same conditions but without the protopectin addition. In other words, it appears that the treated protopectin in the baked goods has a dual function in that it resists absorption of moisture during the wet period of the preparation of the bread, and once the bread has been baked, the structure of the untreated protopectin more nearly approximates that of the untreated protopectin, so that when dispersed throughout the bread, it serves as a humectant to retard and substantially inhibit the development of dryness of the product.

The production of a coated protopectin which has such a small amount of fat on its surface that it can be used in ordinary formulations is a most important inventive contribution to the art of baking. Bakers today do not usually devise their own formulas. The formulas have been obtained after much expense and ordinarily by trained research workers in the field. These formulas are very precise, but usually not patented. Bakers are skilled artisans who carry out their operations in accordance with trade secrets which will not be divulged. To supply the baker merely with an ingredient to go into a formula, or even to supply him with a new formula to use a patented ingredient, would be fruitless effort. For commercial purposes the baker must have a flour which he can use as ordinary flour in his own formula. The same relationships apply to the large food manufacturers who supply the ready-mixes, or flour to the housewife. Today's housewife does not usually attempt to devise her own formulas, or do experimental baking. If she uses flour, she wants to use treated flour as ordinary flour and not to use it only in special combinations. Most of all she wants quick-and-easy predictable results. The proportion of flour which may readily be replaced with the protopectin treated in accordance with this invention, is of the order of 15-25%, preferably about 15%, based on weight of flour used Following this principle, it will be apparent that virtually any formula employing flour can be modified to replace flour, up to about 25% of the weight of flour used, with protopectin treated in accordance with this invention. The value of this kind of formulation employing the protopectin is that the protopectin gives a product bulk and texture while at the same time reducing the calorific value. In consuming products made in accordance with these principles the diet conscious not only eliminate a substantial fraction of flour which would be contained in conventional products which they might consume, but the protopectin has the property of swelling to an extent that the feeling of satiation is derived considerably sooner than it would with conventional products, with the result that by replacement of flour with treated protopectin, using about 15–25% of protopectin based on the weight of flour in the formula, a person will reduce his consumption of this carbohydrate by a figure approaching 50–70%. In realization of this objective therefore, formulations for a series of baked products are included at the end of the examples to illustrate the application of the fundamental approach of replacing a certain percentage of flour by a proportion of treated protopectin.

It is also possible to utilize the protopectin treated in accordance with this invention in a variety of other food compositions so that the end product will have a texture and a physical form acceptable to the consumer and also will develop the physiological and beneficial effect of the protopectin.

For example, it is possible to add the treated protopectin to cereals such as flake products, shredded wheat, and various irregularly shaped particles of breakfast foods including those sold as grapenuts. In general, where the food is prepared in a flake form the protopectin may be added after steam cooking when the mass is shifted to the agitator or equipment where the product is being shaped to its final form. The protopectin can be added in small percentages, approximately 3–6% when it is uncoated, but when it is coated in accordance with this invention as much as 20% of the total mass of the product can be the protopectin.

In products such as shredded wheat, whole bran and products prepared as pebbles, the protopectin is added after steam cooking the grits at the time the mass is shifted to the agitator or breaker equipment. Uncoated protopectin may be added in small amount, i.e., 3 to 6 percent, while coated protopectin may be added to the extent of 20 percent of the total mass.

In general, if it is desired to add the protopectin to any cereal, it is apparent that the addition should be after the prolonged cooking process has been completed, and after some cooling.

Details of processing many prepared foods are not published, but general principles of handling such products indicate that because pressure cooking is involved the protopectin, whether employed in coated or uncoated form should be incorporated in the mix after the cooking operation is over. That is, pressure cooking operations will generally be so drastic that they will result in the hydration of the protopectin, whether it is coated or not.

The following examples illustrate methods of treating protopectin according to the present invention but it is to be understood that these examples are given for purposes of illustration and not of limitation. In these formulas the weight of the treated protopectin is 15% to 25% based on the weight of the flour in the formula, and all percentages are additional to the weight of the flour. It is the custom of the trade to refer to other ingredients of the formula in terms of percentage weight with reference to the weight of the flour.

EXAMPLE 1

Two grams of corn starch are added slowly to 100 cc. of water with stirring. The mixture is heated to the boiling temperature and allowed to boil for about two minutes and then cooled to ambient temperatures. To 100 grams of juice sac protopectin is added 25 cc. of the above starch base with thorough mixing and rubbing of the starch base into the protopectin. The treated protopectin is then dried at a temperature of 212° F. with superficial drying up to 350° F., i.e. at a temperature sufficient to dry and yet insufficient to scorch the product. If heavily agglomerated, the dried particles are pulverized to 60–100 mesh top size. After drying, the treated protopectin will have about 0.5% by weight of dry starch upon the case hardened surface.

In place of the starch base a 2% solution of gelatin or albumen may be used.

EXAMPLE 2

One hundred grams of juice sac protopectin which has been treated according to the procedure described in Example 1 is rubbed together with 5 grams of a composition which is an aqueous emulsion composed of 33% of edible mono- and diglycerides with 67% water and an additional $\frac{1}{10}$% of sorbic acid. The product is warmed slightly while drying. The treated protopectin is suitable for use in bread formulations.

EXAMPLE 3

One hundred grams of protopectin of the type derived from citrus fruit hulls is treated with 3 grams of a suspension of a solid fat-peanut oil composition containing 30% of the solid fat suspended in the oil. The solid fat is a hydrogenated vegetable oil, having a melting point of about 160° F.

To prepare the fat-oil composition the hard fat is melted and held just above its melting temperature. The oil is then added slowly and the temperature kept at about the melting temperature of the hard fat. When addition of the oil is complete, the mixture is kept under agitation while it is allowed to cool. In the cooling the solid fat solidifies to form fine particles and gives the total composition a texture of a uniformly smooth cream. It consists of extremely fine particles of solid fat dispersed in the peanut oil medium.

Microscopic studies of the treated particles of protopectin reveal that the structure is characterized by a superficial outer layer of solid fat particles under which is a thin layer of protopectin penetrated by the peanut oil, while the rest of the protopectin particle, that is the central core, remains untouched.

In accordance with the above procedure, but using a solid beef fat instead of the hydrogenated vegetable oil, or other vegetable oils in place of peanut-oil, similar results are obtained.

EXAMPLE 4

A mixture of edible mono- and diglycerides of vegetable oils (3 pounds of commercial grade 117 S.G.F., melting point about 140° F., and 1 pound of commercial grade 104 S.G.F., melting point about 125° F., manufactured by the Durkee Division of the Glidden Corporation, Cleveland, Ohio) is heated to 160° F. Sorbic acid (0.004 pound) is added to 8 pounds of water heated to 160° F., and the solution is mix-blended with the heated glycerides until the blend has cooled to room temperature.

One hundred grams of protopectin of the type derived from citrus fruit hulls is treated with three grams of the above emulsion by rubbing together. The product is then warmed slowly while drying.

The following formulations illustrate the partial replacement of flour with treated protopectin. In general, the protopectin in these formulations may be treated by any of the methods described in the preceding examples.

*Bread*

| | | |
|---|---|---|
| Gluten flour | 40 | grams 100 |
| Bread flour | 60 | |
| Protopectin (treated) | do | 15 |
| Water | cc | 97½ |
| Yeast | grams | 6 |
| Salt | do | 2 |
| Sugar | do | 6 |

Bread—Continued

| | | |
|---|---|---|
| Milk powder | grams | 4 |
| Shortening | do | 4 |
| A dough conditioner (Fermoloid) | do | 0.20 |

Fermentation: Under normal conditions found in a bakery, the following times have been effective. A good baker will determine his proofing times in accordance with the behavior of the dough.

| | Minutes |
|---|---|
| Sponge | 180 |
| Dough proof | 50 |
| Pan proof | 50 |

Baking can be done under the standard procedures of the baking industry, preferably by the sponge technique commonly used in batch bakeries.

Muffins

| | | |
|---|---|---|
| Flour | grams | 100 |
| Sugar | do | 25 |
| Baking powder | do | 12 |
| Fresh egg | do | 25 |
| Melted shortening (cooking oil) | cc | 25 |
| Instant dry milk | grams | 45 |
| Water | cc | 140 |
| Protopectin, treated as in Ex. 3 | grams | 20 |
| Vanilla flavoring to taste. | | |

All of the dry ingredients are sifted into a bowl, water is added, and then the oil constituting the shortening in the product is added. Individual muffins are weighed out at 75 grams each and baked 20 to 25 minutes in a 400° F. oven. The muffins made with the treated protopectin are uniformly fluffy and compare well in all favorable characteristics with commonly accepted varieties in commerce.

In comparative tests muffins made according to the formula given above, but using untreated protopectin, are soggy and come out of the oven heavier by 10% due to the excess of water present than those made with the treated protopectin. Those formed with the untreated protopectin are also found to be distinctly smaller in appearance.

Waffle mix

| | | |
|---|---|---|
| Winter wheat flour | grams | 100 |
| Fine powdered sugar | do | 27 |
| Cottonseed oil | cc | 8 |
| Whole egg powder | grams | 11 |
| Baking powder | do | 9 |
| Salt | do | 1.75 |
| Protopectin (treated) | do | 20 |

Incorporate oil into the flour, then egg powder, sugar, salt and protopectin. Add baking powder last. Use powder mixer for oil and flour; then transfer into powder mixing machine provided with sifter.

Directions: Mix one pound of waffle mix with 10 oz. (300 cc.) water and bake.

Doughnut mix

| | | |
|---|---|---|
| Winter wheat flour | grams | 100 |
| Fine powdered sugar | do | 25 |
| Cottonseed oil | cc | 4 |
| Egg yolk, powdered | grams | 2 |
| Skim milk powder | do | 5 |
| Salt | do | 1¼ |
| Baking powder | do | 4 |
| Bicarbonate of soda | do | ½ |
| Cream of tartar | do | ¼ |
| Mace oil | do | 9 |
| Vanilla flavoring to taste. | | |
| Protopectin (treated) | do | 20 |

If pressed out by machine, add two whole eggs to five pounds of doughnut flour mix. Incorporate flour and oil; then add all the other ingredients with protopectin last.

Directions: Mix one pound of doughnut mix with 6 oz. of ice cold water, roll out and cut. Fry at about 400° F.

Pancake mix

| | Grams |
|---|---|
| White corn flour | 66 |
| Medium grade wheat flour | 44 |
| Monocalcium phosphate | 4 |
| Sodium bicarbonate | 2¼ |
| Fine salt | 1½ |
| Protopectin (treated) | 20 |

Mix all dry ingredients.

Pound cake mix

| | | |
|---|---|---|
| Winter wheat flour | grams | 100 |
| Fine powdered sugar | do | 65 |
| Cottonseed oil | cc | 150 |
| Egg yolk, powdered | grams | 15 |
| Baking powder | do | 10½ |
| Dry milk powder | do | 18 |
| Salt | do | 1½ |
| Vanilla flavor | cc | 0.75 |
| Lemon oil | cc | 0.75 |
| Protopectin (treated) | grams | 20 |

Mix oil with the flour; then add protopectin. Follow with all other ingredients.

Directions: Mix 1 pound of pound cake flour with ½ pint of cold water, make dough, put in mold and bake at about 400° F.

Sponge cake mix

| | Grams |
|---|---|
| Winter wheat flour | 100 |
| Very fine sugar | 100 |
| Skim milk powder | 30 |
| Egg yolk | 25 |
| Albumen | 8 |
| Baking powder | 10½ |
| Salt | 1¼ |
| Lemon oil | 10 |
| Egg color | Trace |
| Protopectin (treated) | 20 |

Directions: To 2 pounds of sponge cake mix add 12 oz. of lukewarm water and make a dough. Beat dough in machine for 4 to 5 minutes. Put into pans. Bake in moderate oven (325–350° F.).

Biscuit mix

| | Grams |
|---|---|
| Winter wheat flour | 100 |
| Monocalcium phosphate | 3.75 |
| Sodium bicarbonate | 3 |
| Fine salt | 1½ |
| Protopectin (treated) | 20 |

Directions: Make batter with milk or water. Bake.

Various changes and modifications may be made in carrying out the present invention without departing from the scope thereof. Insofar as these changes and modifications are within the purview of the annexed claims, they are to be considered as part of my invention.

I claim:

1. A process for the preparation of a finely divided, dry protopectin composition which comprises coating the outer surfaces of the particles of said protopectin with a colloidal hydrophilic material selected from the group consisting of starch, gelatin and albumen in aqueous media.

2. The method of preparing protopectin compositions for use as partial flour substitutes in the preparation of baked goods which comprises applying to finely divided protopectin material a composition selected from the group consisting of starch, gelatin and albumen in aqueous media, and then drying the protopectin thus treated to develop a case hardened protopectin material.

3. The process of claim 2 in which said hydrophilic material is starch.

4. The process of claim 2 in which said hydrophilic material is gelatin.

5. The method of claim 2 in which said case hardened protopectin is further coated with a hydrophobic solid dispersed in a liquid carrying medium.

6. The method of claim 5 in which said protopectin material is derived from citrus fruit juice sacs.

7. The method of preparing protopectin compositions for use as partial flour substitutes in the preparation of baked goods which comprises applying to finely divided protopectin material a composition selected from the group consisting of
   (a) a two-phase aqueous dispersion of starch, gelatin and albumen, and
   (b) a polyphase dispersion of an edible solid fat in a liquid medium.

8. The method of claim 7 wherein said composition is a two-phase suspension of solid fat in an edible oil.

9. The method of claim 7 wherein said composition is an aqueous emulsion of monoglycerides and diglycerides of a fatty acid.

References Cited by the Examiner
UNITED STATES PATENTS

| | | | |
|---|---|---|---|
| 1,795,980 | 3/31 | Wahl | 99—94 |
| 1,827,794 | 10/31 | Leo | 99—132 |
| 2,145,016 | 1/39 | Spaulding | 167—65 |
| 2,356,635 | 8/44 | Waldschmidt et al. | 99—90 |
| 2,358,086 | 9/44 | Mollner et al. | 99—168 |
| 2,412,282 | 12/46 | Nelson | 99—132 X |
| 2,623,825 | 12/52 | Tressler et al. | 99—94 |

OTHER REFERENCES

Kertesz: The Pectic Substances, Interscience Publishers, Inc., New York, 1951, pages 71–77, 516–518 and 559–560.

A. LOUIS MONACELL, *Primary Examiner.*

ABRAHAM H. WINKELSTEIN, *Examiner.*